United States Patent [19]

Takagi et al.

[11] 4,033,195
[45] July 5, 1977

[54] DRIVEN CLUTCH DEVICE FOR V-BELT TYPE AUTOMATIC TRANSMISSION

[75] Inventors: Izumi Takagi; Masayuki Asazuma, both of Akashi, Japan

[73] Assignee: Kawasaki Heavy Industries, Ltd., Kobe, Japan

[22] Filed: Jan. 2, 1976

[21] Appl. No.: 646,028

[30] Foreign Application Priority Data

Jan. 13, 1975 Japan .................................. 50-7443

[52] U.S. Cl. .......................................... 74/230.17 M
[51] Int. Cl.² ...................... F16H 7/02; F16H 55/52
[58] Field of Search .......... 74/230.17 M, 230.17 E, 74/230.17 A

[56] References Cited

UNITED STATES PATENTS

| | | | |
|---|---|---|---|
| 3,599,504 | 8/1971 | Taylor | 74/230.17 E |
| 3,616,706 | 11/1971 | Shimamoto | 74/230.17 M |
| 3,625,079 | 12/1971 | Hoff | 74/230.17 E |
| 3,811,331 | 5/1974 | Moogk | 74/230.17 A |
| 3,842,637 | 10/1974 | Wilson | 74/230.17 M |

*Primary Examiner*—Samuel Scott
*Assistant Examiner*—Allan R. Burke
*Attorney, Agent, or Firm*—Wenderoth, Lind & Ponack

[57] ABSTRACT

A driven clutch device for V-belt type automatic transmission which has a movable sheave slidably mounted on a driven shaft, a stationary sheave having a cylindrical portion which has one end open, the stationary sheave being secured to the end portion of the driven shaft through a coupling which seals up the open end of the cylindrical portion of the stationary sheave, and which further has a contact part extending along the shaft and from the back of the stationary sheave, a cam bracket having a cam part which contacts the contact part and a torsional spring interposed between the cam bracket and the stationary sheave for connecting them.

1 Claim, 4 Drawing Figures

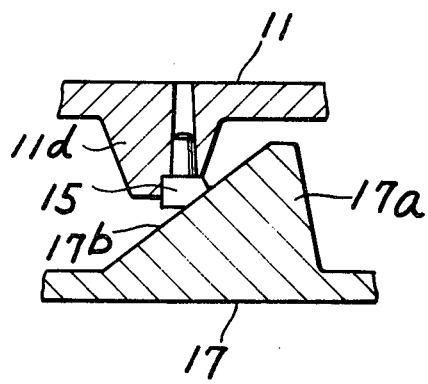
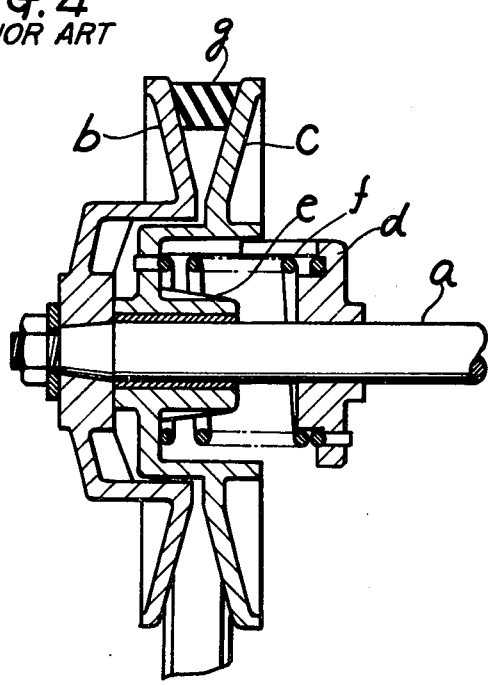

DRIVEN CLUTCH DEVICE FOR V-BELT TYPE AUTOMATIC TRANSMISSION

This invention relates to a driven clutch device provided on the driven shaft side of a V-belt type automatic transmission of the type having a pair of pulley type clutch mechanisms for a V-belt, each having a stationary sheave secured to a shaft and a movable sheave axially slidable along the shaft and more particularly, to a driven clutch device which is so arranged as to transmit the torque of a driving shaft, on an infinitely variable speed basis, to a driven shaft by frictional force between the V-belt and the stationary sheave by making the movable sheave which is constantly biased toward the stationary sheave on the driven shaft, slide according to variations of the diameter of the pulley on the driving shaft side while the V-belt is kept pressed between the stationary sheave and the movable sheave.

The conventional driven clutch device for the aforementioned V-belt type automatic transmission is designed as shown in FIG. 4. In FIG. 4, a stationary sheave (b) is secured to an end portion of a driven shaft (a). A movable sheave (c) is sidably mounted on the driven shaft (a), opposed to said stationary sheave (b) and forming a V-shaped groove therebetween. Secured to the back side (the right-hand side in FIG. 4) of said movable sheave (c) is a cam bracket (d). The movable sheave (c) is always biased toward the stationary sheave (b) by a cam means (e) provided between the cam bracket (d) and the movable sheave (c) and also by coil spring (f), whereby a V-belt (g) is kept pressed between the two sheaves and thus motive power is transmitted to the driven shaft (a) by the friction between the stationary sheave (b) and the V-belt. Conventionally, in order to facilitate detaching of the V-belt, the driven shaft portion (a) carrying the driven clutch device is supported at one end by the bearing means and accordingly in the conventional driven clutch device, the cam mechanism part (cam bracket (d), cam means (e), coil spring (f) and so on) which adjusts axial thrust in accordance with an increase or decrease of load is provided on the back side of the movable sheave (c), or toward the bearing means of the driven shaft (a). In this arrangement, a bending moment is applied to the driven shaft (a), which results in the reducing reliability of the driven shaft (a) at a high running speed Moreover, since the conventional driven clutch device has a construction such that the cam mechanism part is an open type, it is not safe in operation; for example, its parts will scatter if they break.

The present invention has as an object the elimination of the abovedescribed disadvantages. For this purpose, in the present invention the cam mechanism part which adjusts the axial thrust according to the increase or decrease of the load is provided toward the stationary sheave side or toward the end of the driven shaft and is an enclosed type, whereby the load point of the belt on the driven shaft is positioned nearer the shaft bearing means, which results in improved reliability at high running speed and improved safety of the device.

The nature and advantages of the present invention will be understood more clearly from the following description given with reference to the accompanying drawings, in which:

FIG. 3 is a cross section, taken along the line A — A in FIG. 2, and

FIG. 4 is a longitudinal side elevation of the central part of a conventional device.

Figure 1:
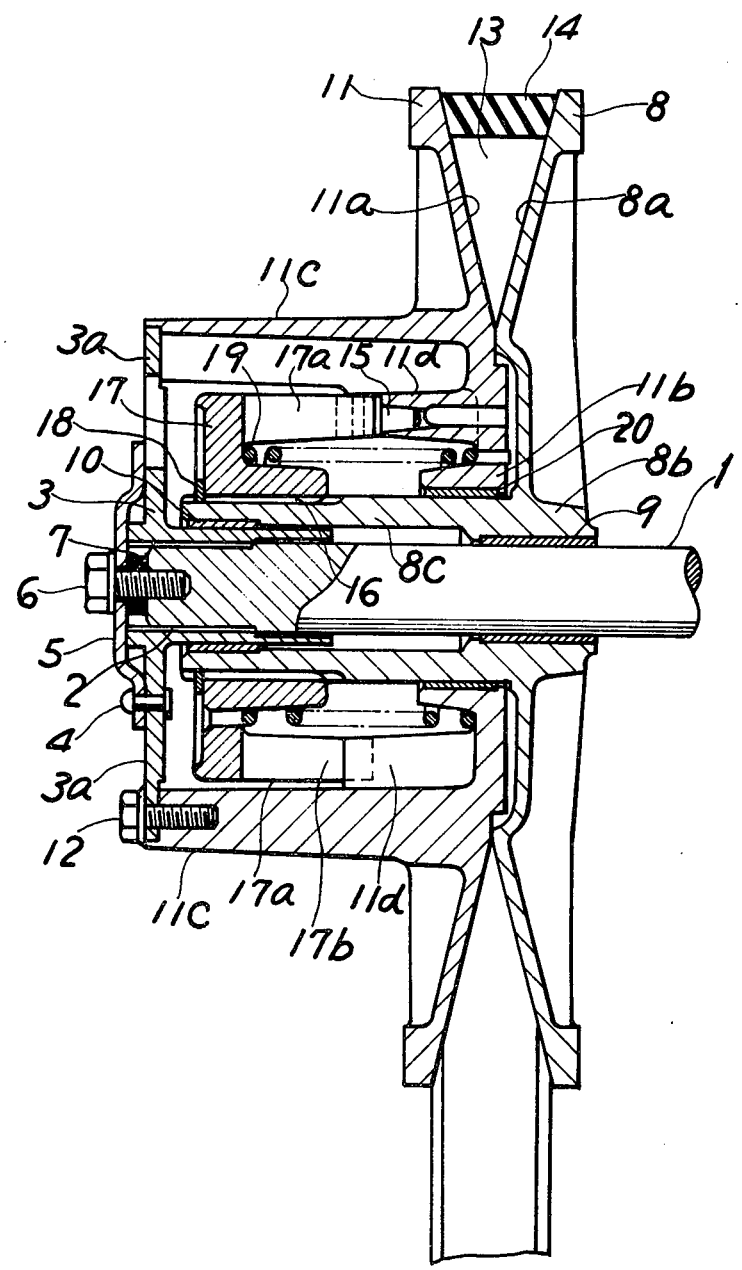
FIG. 1 is a longitudinal side elevation of the central part of an embodiment of the present invention, in the non-operating state.

In FIG. 1, numeral 1 denotes a driven shaft. Provided at an end portion of said driven shaft 1 is a spline 2, with which a coupling 3 having a flange 3a is engaged by a key lock or spline lock. The coupling 3 is secured to the aforementioned driven shaft 1 by means of a bolt 6 extending into the end of shaft 1 through a support plate 5 which is connected integrally with said flange 3a by means of a rivet 4. Numeral 7 denotes an adjusting shim which is engaged with the stem of the bolt 6 between the end surface of the shaft and the support plate 5, for adjusting the position of the coupling 3 axially of the shaft.

A movable sheave 8 having a conical web also has a boss 8B slidably disposed on the aforementioned driven shaft 1 on a bushing 9. The boss part 8b of said movable sheave 8 has a cylindrical extension 8c which extends toward the shaft end and is slidably disposed on the coupling 3 through the medium of a bushing 10. Opposed to said movable sheave 8 and nearer the end portion of the shaft is a stationary sheave 11. Sheave 11 has a conical web 11a and a cylindrical part 11c coaxial with the shaft 1 and extending away from the movable sheave 8 and having an open end. A boss 11b within the cylindrical part 11c is slidably disposed on the cylindrical extension 8c of the above-described movable sheave 8 on a bushing 20. The open end of the cylindrical part 11c of said stationary sheave 11 is secured to the peripheral portion of the flange 3a of the above-described coupling 3 and thus the stationary sheave 11 is secured to the end of the driven shaft 1. The web 11a of the stationary sheave 11 and the web 8a of the movable sheave 8 have opposite cone angles so as to form therebetween a V-shaped groove 13 in which a V-belt 14 is placed and kept pressed between the two webs 8a and 11a.

The boss part 11b of the stationary 11 has several contact parts 11d on the periphery of the boss part 11b, each protruding in the direction of the end of the shaft, and a bushing 15 is held in the free end of each of said contact parts 11d. On the other hand, a splined portion 16 is provided on the outer periphery of the end of the cylindrical extension 8c of the movable sheave 8. In this splined portion 16 is mounted a cam bracket 17 which is secured to the cylindrical extension 8c by means of a snap ring 18. The cam bracket 17 carries several cam parts 17a which project toward the bearing means of the driven shaft 1 (rightward in FIG. 1) and each has a slanted cam surface 17b abutting the bushing 15. The respective contact parts 11d slide on the cam surfaces 17b through the medium of the bushings 15 (FIG. 3). In order to maintain this contact, a torsional spring 19 is interposed between the boss part 11b of the stationary sheave 11 and the cam bracket 17, and is compressed in such a way that the movable sheave 8 is pushed toward the stationary sheave 11.

Figure 2:
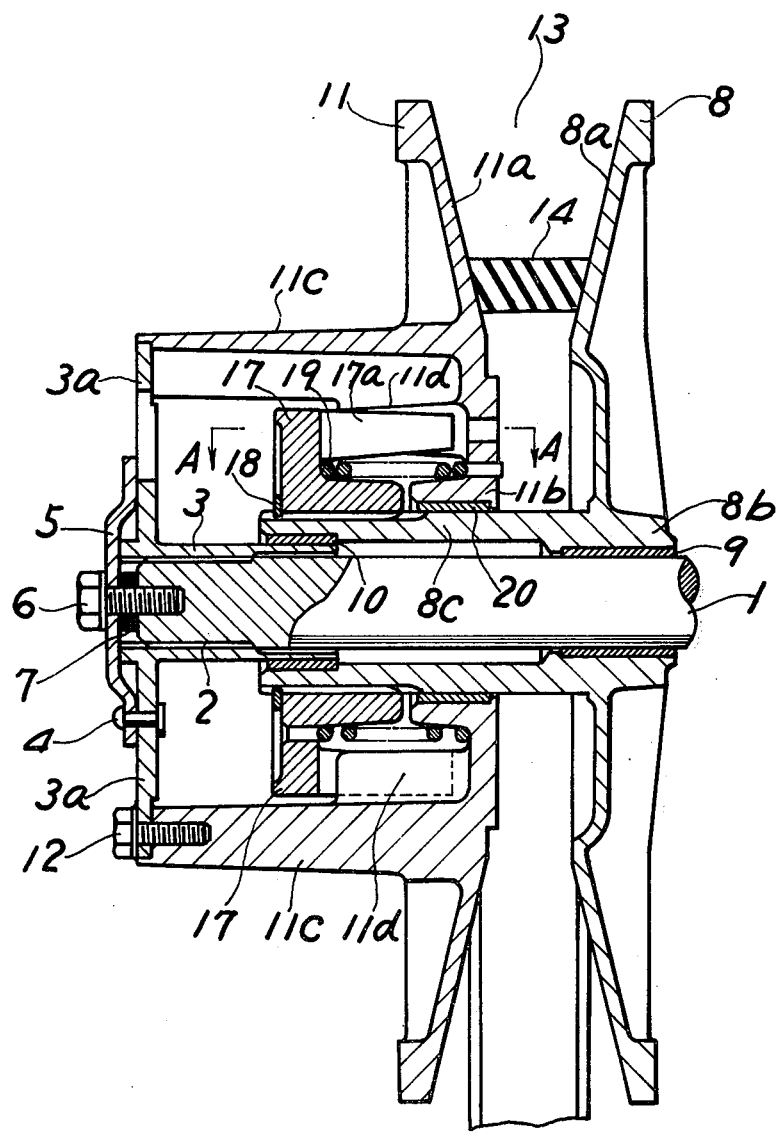
FIG. 2 is a longitudinal side elevation of the central part of an embodiment of the present invention, in its operating state.

Referring now to the operation of the above embodiment, when the pulley diameter of the pulley on the driving side (not shown in the drawing) of V-belt type automatic transmission increases, the V-belt 14 is drawn toward the driving pulley, whereupon the movable sheave 8 is urged away from the stationary sheave 11 (in the direction of the bearing means of the driven shaft 1). At this time, the torsional force and compressive reaction force of the torsional spring 19, coupled with the axial thrust generated at the cam parts 17a of the cam bracket 17 sliding in contact with the contact part 11d of the stationary sheave 11 through the medium of the bushings 15, act to oppose sliding of the movable sheave 8 away from stationary sheave 11. Thus, as shown in FIG. 2, the V-belt 14 is pulled toward the driving pulley while it is kept pressed between the two sheaves 8, 11, with the result that the pulley diameter on the driven side becomes smaller and motive power is transmitted to the driven shaft 1 by the friction between the V-belt 14 and the stationary sheave 11.

According to the driven clutch device for the V-belt type automatic transmission of the present invention, the cam mechanism (the contact parts of the stationary sheave in sliding contact with the cam parts of the cam bracket and the torsional spring between the stationary sheave and the cam bracket, etc.) which adjusts the axial thrust of the movable sheave according to the increase or decrease of the load due to drawing of the V-belt toward the drive pulley is provided on the back side of the stationary sheave, i.e., at the end of the driven shaft on the opposite side of the pulley from the bearing support. This arrangement, as compared with the conventional cam mechanism part which is provided on the movable sheave side, toward the bearing support, makes it possible to locate the load point of the belt 14 on the driven shaft due to the drawing of the belt toward the drive pulley; which acts on the driven shaft by attraction of the belt nearer the bearing means which supports the driven shaft at only one point. Therefore, the bending moment on the driven shaft is reduced, which results in improved safety and reliability at high running speeds. Moreover, the cam mechanism is enclosed in the stationary sheave and this arrangement will improve the safety of the device, for example, if the device breaks.

What is claimed is:

1. A driven clutch device for a V-belt automatic transmission having a drive shaft supported in a single bearing means and a driving pulley mounted thereon with a symmetrical V-shaped groove therein and a stationary sheave on the driving shaft adjacent the bearing means and a movable sheave on the shaft on the opposite side of the stationary sheave from the bearing means and movable toward and away from the stationary sheave for varying the size of the V-shaped groove, a V-belt around said driving pulley in said V-shaped groove, and a driven shaft supported in a single bearing means, said driven clutch device comprising a stationary sheave around said driven shaft having a cylindrical part extending coaxially with said driven shaft toward the free end of the driven shaft, a coupling attached to said cylindrical part and closing the open end thereof and attached to the end of said driven shaft, a movable sheave slidably mounted on said driven shaft between the stationary sheave and the bearing means for movement along said driven shaft and defining a symmetrical V-shaped groove in which said V-belt is positioned, said movable sheave having a cylindrical extension coaxial with said driven shaft and extending slidably through said stationary sheave, a cam bracket on said cylindrical extension within said cylindrical part and having cam surfaces thereon facing said stationary sheave, said stationary sheave having contact parts thereon projecting toward and contacting said cam surfaces for moving said cam bracket away from said stationary sheave on relative rotation in one direction, and a torsion spring means between said cam bracket and said stationary sheave urging said stationary sheave and said cam bracket apart, whereby said movable sheave is urged toward said stationary sheave.

* * * * *